United States Patent
Shen (10) Patent No.: US 10,581,822 B2
(45) Date of Patent: Mar. 3, 2020

(54) METHODS, APPARATUSES, SYSTEM AND COMPUTER PROGRAM PRODUCT FOR SUPPORTING LEGACY P-CSCF TO INDICATE THE S-CSCF TO SKIP AUTHENTICATION

(75) Inventor: Jiadong Shen, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 58 days.

(21) Appl. No.: 13/056,672

(22) PCT Filed: Jul. 31, 2009

(86) PCT No.: PCT/EP2009/059925
§ 371 (c)(1),
(2), (4) Date: Jan. 31, 2011

(87) PCT Pub. No.: WO2010/012821
PCT Pub. Date: Feb. 4, 2010

(65) Prior Publication Data
US 2011/0131267 A1    Jun. 2, 2011

(30) Foreign Application Priority Data

Aug. 1, 2008   (WO) .................. PCT/EP2008/060148

(51) Int. Cl.
*G06F 15/16* (2006.01)
*H04L 29/06* (2006.01)
(Continued)

(52) U.S. Cl.
CPC ........ *H04L 63/08* (2013.01); *H04L 29/12188* (2013.01); *H04L 61/1588* (2013.01);
(Continued)

(58) Field of Classification Search
CPC ............. H04L 65/1073; H04L 65/1016; H04L 61/1588; H04L 63/08; H04L 29/12188;
(Continued)

(56) References Cited

U.S. PATENT DOCUMENTS

| 5,387,981 A | 2/1995 | Orlen et al. ................. 358/400 |
| 6,341,220 B1 | 1/2002 | Hurme .......................... 455/410 |

(Continued)

FOREIGN PATENT DOCUMENTS

| CN | 1474586 A | 2/2004 |
| CN | 1475091 A | 2/2004 |

(Continued)

OTHER PUBLICATIONS

3GPP TS 23.292 V8.0.0 (Jun. 2008), 3rd Generation Partnership Project; Technical Specification Group Services and System Aspects; IP Multimedia Subsystem (IMS) Centralized Services; Stage 2 (Release 8), pp. 7,11,13,17,18,19.*

(Continued)

*Primary Examiner* — Un C Cho
*Assistant Examiner* — Jose L Perez
(74) *Attorney, Agent, or Firm* — Harrington & Smith (57) ABSTRACT

It is disclosed a method including transmitting, after successful registration of a terminal at a network entity, a registration message including terminal identity information and integrity indication information indicating affirmative integrity of the terminal identity information; and a method including processing, after reception of the registration message, the received registration message based on the terminal identity information and the integrity indication information such that, i) if the integrity is indicated affirmative, an authentication procedure of the terminal is skipped, or, ii) if the integrity is indicated negative, the received registration message is rejected without provisioning of key information related to registration of the terminal.

19 Claims, 3 Drawing Sheets

(51) Int. Cl.
*H04L 29/12* (2006.01)
*H04W 8/04* (2009.01)

(52) U.S. Cl.
CPC ...... *H04L 65/1016* (2013.01); *H04L 65/1073* (2013.01); *H04W 8/04* (2013.01)

(58) Field of Classification Search
CPC ... H04L 63/0407; H04L 67/147; H04L 67/14; H04L 67/148; H04L 63/0853; H04W 8/04; H04W 60/00
USPC ........ 709/223, 227, 228, 225, 402; 370/352, 370/328, 401, 321, 402
See application file for complete search history.

(56) References Cited

U.S. PATENT DOCUMENTS

| | | | |
|---|---|---|---|
| 7,590,073 B2* | 9/2009 | Beckmann et al. | 370/254 |
| 2003/0229787 A1* | 12/2003 | Gabor | H04L 29/12066 713/168 |
| 2004/0085949 A1* | 5/2004 | Partanen et al. | 370/352 |
| 2004/0121760 A1* | 6/2004 | Westman | H04L 63/08 455/411 |
| 2007/0008957 A1* | 1/2007 | Huang | 370/352 |
| 2007/0130471 A1* | 6/2007 | Walker Pina | H04L 63/0815 713/182 |
| 2008/0039085 A1 | 2/2008 | Phan-Anh | 455/435.1 |
| 2008/0045214 A1* | 2/2008 | Wen | H04L 9/3271 455/435.1 |
| 2008/0092226 A1* | 4/2008 | Horvath | H04L 63/164 726/12 |
| 2008/0267171 A1* | 10/2008 | Buckley | H04L 29/06027 370/352 |
| 2008/0295168 A1* | 11/2008 | Bajko et al. | 726/21 |
| 2009/0055899 A1* | 2/2009 | Deshpande et al. | 726/4 |
| 2009/0190573 A1* | 7/2009 | Siegel | H04L 65/1016 370/352 |
| 2010/0182985 A1* | 7/2010 | Guenther et al. | 370/338 |
| 2011/0134843 A1* | 6/2011 | Noldus | H04W 60/005 370/328 |

FOREIGN PATENT DOCUMENTS

| | | | | |
|---|---|---|---|---|
| CN | 1610441 A | | 4/2005 | |
| CN | 1802028 A | | 7/2006 | |
| CN | 101043701 A | * | 9/2007 | |
| EP | 1 715 625 A1 | | 10/2006 | |
| JP | 2005/521335 A | | 7/2005 | |
| RU | 2126597 C1 | | 2/1999 | |
| RU | 2204219 C2 | | 5/2003 | |
| WO | WO 2009142473 A1 | * | 11/2009 | |
| WO | WO 2010000295 A1 | * | 1/2010 | ........ H04L 65/1073 |

OTHER PUBLICATIONS

Lin et al., One-Pass GPRS and IMS Authentication Procedure for UMTS, Jun. 2005, IEEE Journal on Selected Areas in Communications, vol. 23, No. 6, whole document.*

3GPP TR 23.892, 3GPP; Technical Specification Group Services and System Aspects; IP Multimedia Subsystem (IMS) centralized services (Release 8), Mar. 2008, V8.0.1, pp. 10, 91, 107-109 (Year: 2008).*
3GPP TS 24.229, 3GPP; Technical Specification Group Core Network and Terminals; IP multimedia call control protocol based on SIP and SDP; Stage 3 (Release 7), Jun. 2008, V7.12.0, pp. 34, 93 (Year: 2008).*
Motorola, C1-081936, Correction to de-registration procedure when registration expires; May 5-9, 2008, 3GPP TSG CT WG1 Meeting #53, whole document (Year: 2008).*
3GPP TS 24.229 V8.4.1 (Jun. 2008) 3rd Generation Partnership Project; Technical Specification Group Core Network and Terminals; IP Multimedia Call Control Protocol Based on Session Initiation Protocol (SIP) and Session Description Protocol (SDP); Stage 3 (Release 8) Jun. 2008, (516 Pages).
C1-083064, 3GPP TSG CT WG1 Meeting #55, Budapest, Hungary, Aug. 18-22, 2008, "Discussion on Authentication for ICS", 1 pg.
3GPP TS 23.292 V8.0.0 (Jun. 2008), "$3^{rd}$ Generation Partnership Project; Technical Specification Group Services and System Aspects; IP Multimedia Subsystem (IMS) Centralized Services; Stage 2 (Release 8)", 90 pgs.
3GPP TR 33.803 V0.1.0 (Nov. 2006), "$3^{rd}$ Generation Partnership Project; Technical Specification Group Services and System Aspects; Coexistence between TISPAN and 3GPP authentication schemes (Release 7)", 28 pgs.
3GPP TS 33.203 V8.0.3 (Jun. 2008), "$3^{rd}$ Generation Partnership Project; Technical Specification Group Services and System Aspects; 3g Security; Access security for IP based services (Release 8)", 96 pgs.
3GPP TSG SA WG2 Meeting #61, Nokia Siemens Networks, Nokia, TD S2-075268, "Bearer mapping principle amendments to 3GPP IRAT handover and RAU/TAU scenarios", Ljubljana, Slovenia, Nov. 12-16, 2007, SAE/Release 8 (36 pages).
3GPP TSG SA WG2 Meeting #61, Nokia Siemens Networks, Nokia, TD S2-075269, "Handling of Dual-stack Bearers during Inter-3GPP mobility", Ljubljana, Slovenia, Nov. 12-16, 2007, SAES / Rel8 (5 pages).
3GPP TSG SA WG2 Meeting #63, Mavenir, Ericsson, Vodafone, ZTE, Nokia Siemens Networks, NEC, Nortel, TD S2-081285, "Registration via CS Access—Flow", Athens, Greece, Feb. 18-22, 2008, ICSRA-St2 / Release (2 pages).
3GPP TSG SA WG2 Meeting #63, Mavenir, Ericsson, Vodafone, ZTE, Nokia Siemens Networks, NEC, Nortel, Telefonica O2 Europe, "Registration via CS Access—Flow", Athens, Greece, Feb. 18-22, 2008, ICSRA-St2 / Release 8 (2 pages).
"ICS Registration", 3GPP TSG SA WG2 Architecture—SA2-57, S2-071863, Nortel, Ericsson, Apr. 2007, 5 pgs.
ZTE; "The Registration Expiration Time Setting for Enhanced MSC Server Solution"; 3GPP TSG SA WG2 Meeting #61, TD S2-075274; Nov. 12-16, 2007; Ljubljana, Slovenia; whole document (3 pages).
Ericsson et al.; "Editorial changes on RUA registration for I1-cs model"; 3GPP TSG SA WG2 Meeting #61, TD S2-075139; Nov. 12-16, 2007; Ljubljana, Slovenia; whole document (8 pages).
3GPP TS 23.292 V0.5.1; "$3^{rd}$ Generation Partnership Project; Technical Specification Group Services and System Aspects; IP Multimedia Subsystem (IMS) Centralized Services; Stage 2 (Release 8)"; May 2008; whole document (92 pages).

* cited by examiner

METHODS, APPARATUSES, SYSTEM AND COMPUTER PROGRAM PRODUCT FOR SUPPORTING LEGACY P-CSCF TO INDICATE THE S-CSCF TO SKIP AUTHENTICATION

FIELD OF THE INVENTION

The present invention relates to identity protection. More specifically, the present invention relates to methods, apparatuses, a system and a related computer program product for identity protection. Examples of the present invention may be applicable to internet protocol (IP) multimedia subsystem (IMS) centralized services (ICS).

BACKGROUND

ICS has been considered and introduced in the $3^{rd}$ generation partnership program (3GPP) e.g. release 8, technical specification (TS) 23.292.

ICS may provide communication services such that all services, and service control, are based e.g. on IMS mechanisms and enablers. ICS enables IMS services to users that are attached e.g. via the centralized service. When an ICS user accesses the IMS by using circuit switched (CS) access, i.e. via a ICS mobile switching center (IMSC) server (a MSC server supporting ICS), authentication and authorization may be performed in the IMSC server and therefore, e.g. a serving call session control function (S-CSCF) may skip IMS authentication for such an IMS registration.

The ICS user may be assigned a so-called special ICS IMS private user identity (IMPI) when accessing the IMS e.g. via the CS domain. The S-CSCF may use this special ICS IMPI as an indication for this situation that the user has been already authenticated and authorized by the IMSC server. However, the ICS IMPI is not protected against abuse. A malicious user may use such a special ICS IMPI to use the IMS service e.g. free of charge, as the authentication process is skipped.

In earlier IMS releases this was solved by the P-CSCF which checks a received registration request from a user and passes it on towards the S-CSCF indicating if the register request might come from a potential malicious user or not. The S-CSCF may then challenge the register request if the P-CSCF has indicated that the register request might come from a malicious user.

However the situation is different in the ICS system, since IMSC is now performing the registration and an additional authentication by the S-CSCF shall be avoided when the user has already been successful authenticated and authorized by the IMSC.

In the standardization bodies (e.g. 3GPP), it was discussed to use the P-Access-Network-Info (PANI) header to indicate from IMSC to S-CSCF that authentication may be skipped. The PANI header may contain information about the access network and a "network-provided" parameter. The information about the access network may inform the S-CSCF that authentication has already been performed.

A possible drawback of the PANI header solution resides in that older Releases P-CSCFs may not support the "network-provided" mechanism. Thus, a possibility may exist that this mechanism may be abused by a malicious user. The malicious user may set the "network-provided" parameter and an unaware P-CSCF may not remove the parameter. As a consequence, the S-CSCF may skip authentication.

One way to solve this problem may be appropriate administration, i.e. the S-CSCF may decide whether or not to accept the "network-provided" indication based on a database. However, such a database requires additional administration which may, in roaming scenarios, become unmanageable.

Another approach resides in using a solution based on databases only, where all MSC servers supporting ICS (IMSCs) are stored. Furthermore, the S-CSCF may only skip the authentication process if the ICS user registers e.g. with IMS via such an IMSC server. However, this alternative may cause an unacceptable administrative effort and will also cause large problem for the synchronization of the databases.

A further possible drawback may reside in that, as an ICS user may also access its home IMS domain via a visited IMSC server in case of roaming, all IMSC servers in foreign CS roaming domains have also to be stored in the database. This means whenever an IMSC server is added or removed, the databases in all domains with a roaming agreement have to be updated. This will cause unacceptable administrative efforts and will also cause a large problem for the synchronization of the databases.

In consideration of the above, it is an object of examples of the present invention to overcome one or more of the above drawbacks. In particular, the present invention provides methods, apparatuses, a system and a related computer program product for identity protection.

According to an example of the present invention, in a first aspect, this object is for example achieved by a method comprising:
  transmitting, after successful registration of a terminal at a network entity, a registration message comprising terminal identity information and integrity indication information indicating affirmative integrity of the terminal identity information.

According to further refinements of the example of the present invention as defined under the above first aspect,
  the method further comprises generating the registration message by the network entity;
  the registration message is one of an initial registration message, a re-registration message and a de-registration message;
  the network entity is an internet protocol multimedia subsystem centralized service enhanced mobile switching center.

According to an example of the present invention, in a second aspect, this object is for example achieved by a method comprising:
  processing, after reception of a registration message comprising terminal identity information and integrity indication information indicating integrity of the terminal identity information, the received registration message based on the terminal identity information and the integrity indication information such that,
  i) if the integrity is indicated affirmative, an authentication procedure of the terminal is skipped, or,
  ii) if the integrity is indicated negative, the received registration message is rejected without provisioning of key information related to registration of the terminal.

According to further refinements of the example of the present invention as defined under the above second aspect,
  the method further comprises receiving the registration message;
  the key information relates to a secure registration between the terminal and a network control entity;
  the processing of item i) is performed if a successful registration of the terminal is recognized, and the processing of item ii) is performed if the received registration message is recognized as unprotected;

the integrity indication information indicating negative integrity is constituted by an integrity-protected flag being set to no.

According to further refinements of the example of the present invention as defined under the above first and second aspects, the integrity indication information indicating affirmative integrity is constituted by an integrity-protected flag being set to yes;

the registration message is a session initiation protocol register message;

the terminal identity information is constituted by a special internet protocol multimedia subsystem centralized service internet protocol multimedia private identity.

According to an example of the present invention, in a third aspect, this object is for example achieved by an apparatus comprising:

means for transmitting, after successful registration of a terminal at the apparatus, a registration message comprising terminal identity information and integrity indication information indicating affirmative integrity of the terminal identity information.

According to further refinements of the example of the present invention as defined under the above third aspect, the apparatus further comprises means for generating the registration message;

the registration message is one of an initial registration message, a re-registration message and a de-registration message;

the apparatus is constituted by an internet protocol multimedia subsystem centralized service enhanced mobile switching center.

According to an example of the present invention, in a fourth aspect, this object is for example achieved by an apparatus comprising:

means for processing, after reception of a registration message comprising terminal identity information and integrity indication information indicating integrity of the terminal identity information, the received registration message based on the terminal identity information and the integrity indication information such that, i) if the integrity is indicated affirmative, an authentication procedure of the terminal is skipped, or, ii) if the integrity is indicated negative, the received registration message is rejected without provisioning of key information related to registration of the terminal.

According to further refinements of the example of the present invention as defined under the above fourth aspect, the key information relates to a secure registration between the terminal and a network control entity;

the apparatus further comprises means for receiving the registration message;

the means for receiving is configured to receive the registration message from one of the network control entity and the apparatus according to the third aspect;

the means for processing is configured to process according to item i) if a successful registration of the terminal is recognized, and is configured to process according to item ii) if the received registration message is recognized as unprotected;

the integrity indication information indicating negative integrity is constituted by an integrity-protected flag being set to no;

the apparatus is constituted by a serving call session control function.

According to further refinements of the example of the present invention as defined under the above third and fourth aspects, the integrity indication information indicating affirmative integrity is constituted by an integrity-protected flag being set to yes;

the registration message is a session initiation protocol register message;

the terminal identity information is constituted by a special internet protocol multimedia subsystem centralized service internet protocol multimedia private identity;

the network control entity is constituted by a proxy call session control function;

at least one, or more of means for transmitting, means for generating, means for processing, means for receiving and the apparatus is implemented as a chipset or module.

According to an example of the present invention, in a fifth aspect, this object is for example achieved by an apparatus comprising:

a transmitter configured to transmit, after successful registration of a terminal at the apparatus, a registration message comprising terminal identity information and integrity indication information indicating affirmative integrity of the terminal identity information.

According to further refinements of the example of the present invention as defined under the above fifth aspect, the apparatus further comprises a generator configured to generate the registration message;

the registration message is one of an initial registration message, a re-registration message and a de-registration message;

the apparatus is constituted by an internet protocol multimedia subsystem centralized service enhanced mobile switching center.

According to an example of the present invention, in a sixth aspect, this object is for example achieved by an apparatus comprising:

a processor configured to process, after reception of a registration message comprising terminal identity information and integrity indication information indicating integrity of the terminal identity information, the received registration message based on the terminal identity information and the integrity indication information such that, i) if the integrity is indicated affirmative, an authentication procedure of the terminal is skipped, or, ii) if the integrity is indicated negative, the received registration message is rejected without provisioning of key information related to registration of the terminal.

According to further refinements of the example of the present invention as defined under the above sixth aspect, the key information relates to a secure registration between the terminal and a network control entity;

the apparatus further comprises a receiver configured to receive the registration message;

the receiver is configured to receive the registration message from one of the network control entity and the apparatus according to the fifth aspect;

the processor is configured to process according to item i) if a successful registration of the terminal is recognized, and is configured to process according to item ii) if the received registration message is recognized as unprotected;

the integrity indication information indicating negative integrity is constituted by an integrity-protected flag being set to no;

the apparatus is constituted by a serving call session control function.

According to further refinements of the example of the present invention as defined under the above fifth and sixth aspects, the integrity indication information indicating affirmative integrity is constituted by an integrity-protected flag being set to yes;

the registration message is a session initiation protocol register message;

the terminal identity information is constituted by a special internet protocol multimedia subsystem centralized service internet protocol multimedia private identity;

the network control entity is constituted by a proxy call session control function;

at least one, or more of a transmitter, a generator, a processor, a receiver and the apparatus is implemented as a chipset or module.

According to an example of the present invention, in a seventh aspect, this object is for example achieved by a system comprising:

a terminal;

an apparatus according to any one of the above third and fifth aspects; and an apparatus according to any one the above fourth and sixth aspects.

According to an example of the present invention, in an eighth aspect, this object is for example achieved by a computer program product comprising code means for performing method steps of a method according to any one of the above first and second aspects, when run on a processing means or module.

According to an example of the present invention, in a ninth aspect, this object is for example achieved by a computer program comprising code means for performing a method comprising:

transmitting, after successful registration of a terminal at a network entity, a registration message comprising terminal identity information and integrity indication information indicating affirmative integrity of the terminal identity information.

According to an example of the present invention, in a tenth aspect, this object is for example achieved by a computer program comprising code means for performing a method comprising:

processing, after reception of a registration message comprising terminal identity information and integrity indication information indicating integrity of the terminal identity information, the received registration message based on the terminal identity information and the integrity indication information such that, i) if the integrity is indicated affirmative, an authentication procedure of the terminal is skipped, or, ii) if the integrity is indicated negative, the received registration message is rejected without provisioning of key information related to registration of the terminal.

In this connection, it has to be pointed out that examples of the present invention enable one or more of the following:

Enabling the S-CSCF to verify whether the sender of a registration request is an IMSC or not, by ensuring that, by means of the concept only IMSC can send such an integrity protected request, and that via a P-CSCF only unprotected REGISTER request for ICS users can reach a S-CSCF;

based on the item above, the S-CSCF can skip authorization and authentication if the register request is received from an IMSC.

Providing a solution for the problem discussed in the standardization bodies (e.g. 3GPP);

Alleviating administrative efforts and avoiding problems related to synchronization of the databases;

Enabling the IMSC server to generate a register request, which in addition includes e.g. the special ICS IMPI.

BRIEF DESCRIPTION OF THE DRAWINGS

Examples of the present invention are described herein below with reference to the accompanying drawings, in which.

DETAILED DESCRIPTION OF THE PRESENT INVENTION

Examples of the present invention are described herein below by way of example with reference to the accompanying drawings.

It is to be noted that for this description, the terms "IMSC, SIP REGISTER, special ICS IMPI, integrity_protected flag, integrity_protected flag='yes' and integrity_protected flag='no'" are examples for "network entity, registration message, terminal identity information, integrity indication information, affirmative integrity and negative integrity", respectively, without restricting the latter-named terms to the special technical or implementation details imposed to the first-named terms.

Figure 1:
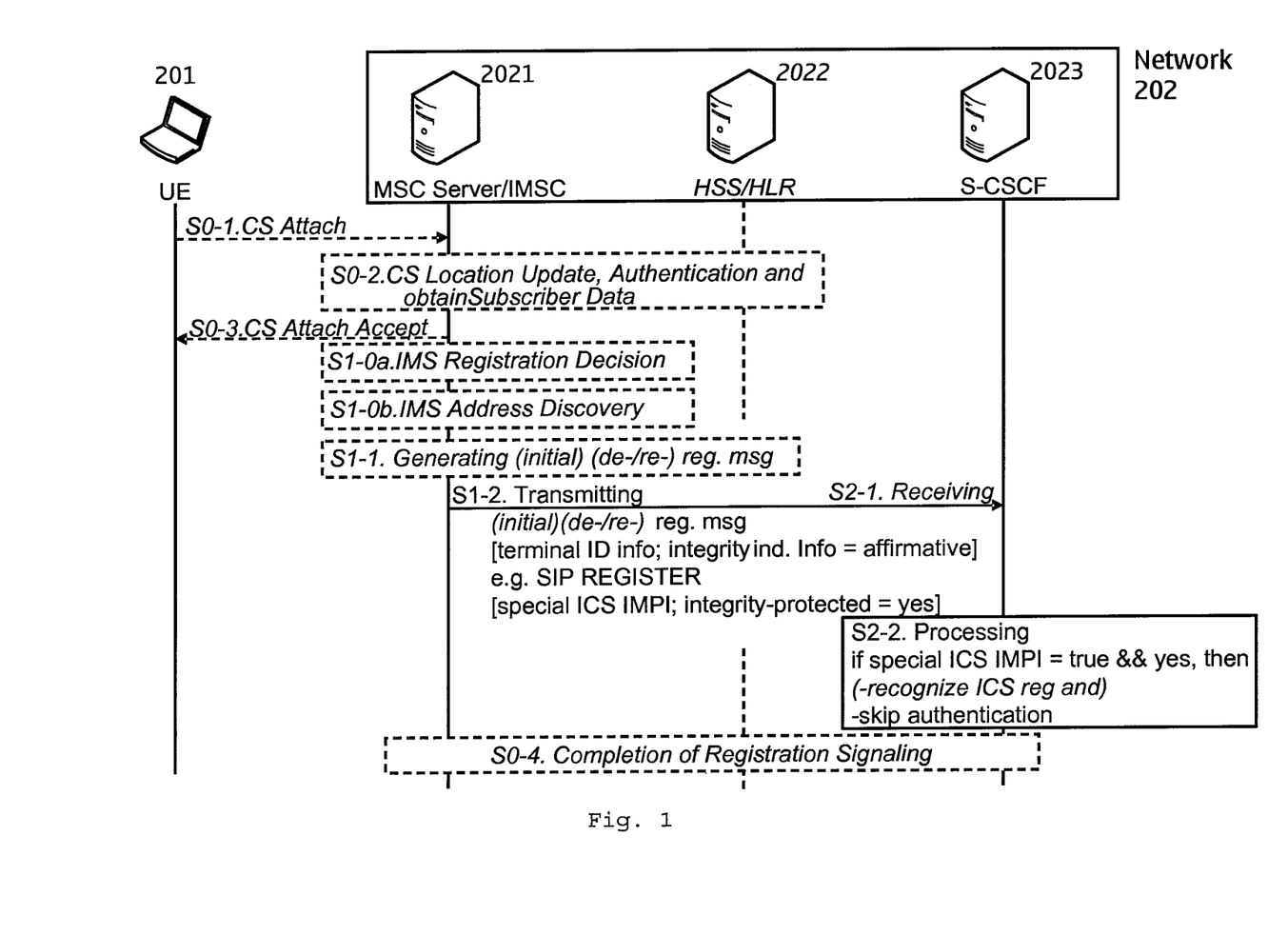
FIG. 1 shows methods for identity protection according to an example of the present invention in case of acceptance of the registration request.
Figure 2:
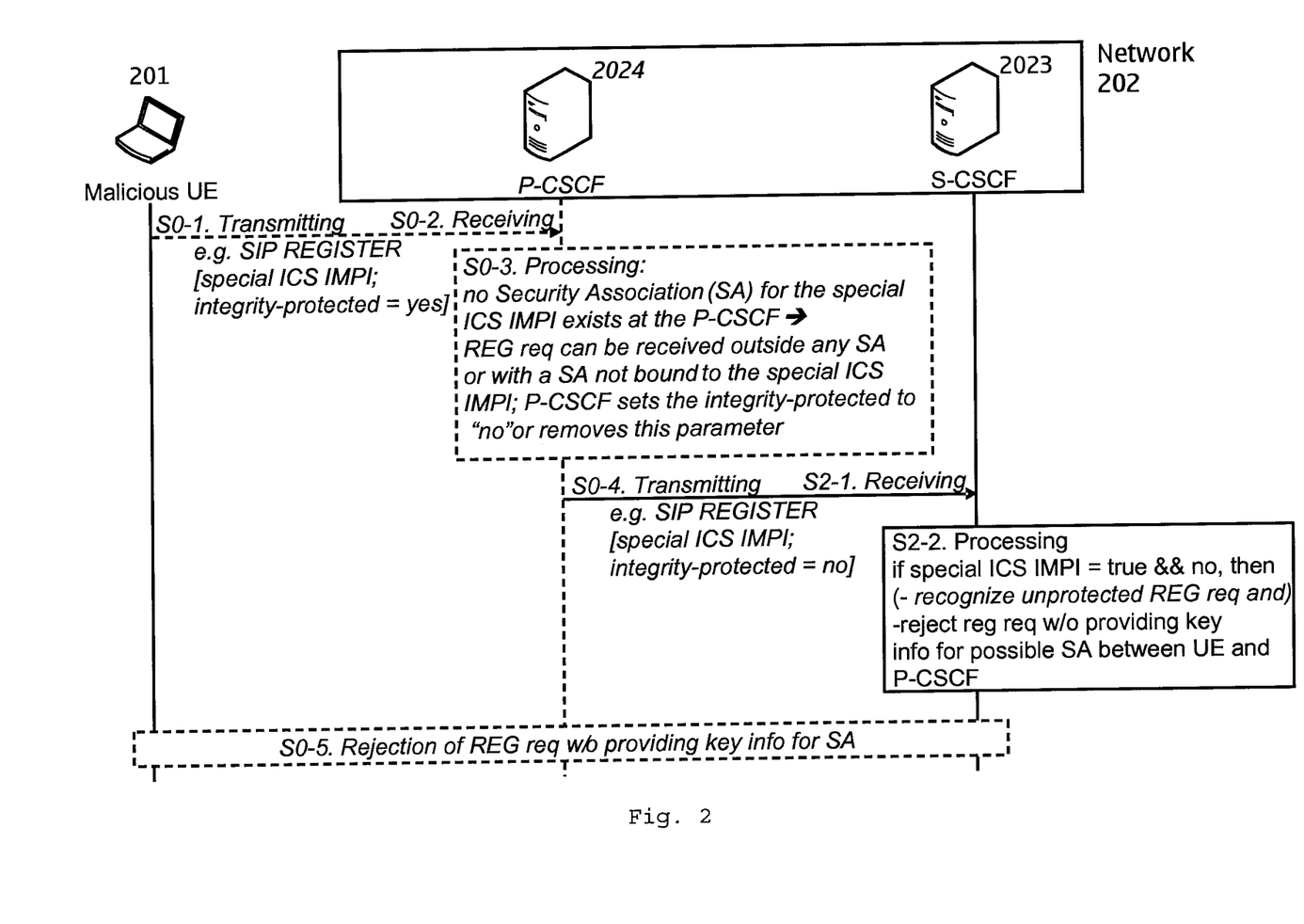
FIG. 2 shows the methods for identity protection according to an example of the present invention in case of rejection of the registration request.

FIG. 1 shows methods for identity protection according to an example of the present invention in case of acceptance of the registration request, while FIG. 2 shows methods in case of rejection of the registration request. Signaling between elements is indicated in horizontal direction, while time aspects between signaling may be reflected in the vertical arrangement of the signaling sequence as well as in the sequence numbers. It is to be noted that the time aspects indicated in FIGS. 1 and 2 do not necessarily restrict any one of the method steps shown to the step sequence outlined. This applies in particular to method steps that are functionally disjunctive with each other. Within FIGS. 1 and 2, for ease of description, means or portions which may provide main functionalities are depicted with solid functional blocks or arrows and/or a normal font, while means or portions which may provide optional functions are depicted with dashed functional blocks or arrows and/or an italic font.

As shown in FIG. 1, a communication system 200 may comprise a terminal or user equipment (UE) 201 and a network 202. The network 202 may in turn comprise an MSC server or IMSC 2021 (referred to as "IMSC" hereinafter), an optional home subscriber server/home location register (HSS/HLR) 2022 and an S-CSCF 2023.

As optional preparatory measures, in optional steps S0-1 to S0-3, e.g. the UE 201 may perform registering (or attaching) to the IMSC 2021. Furthermore, in optional step S1-0a, e.g. the IMSC 2021 may perform deciding on the IMS registration received from the UE 201, and in optional step S1-0b, e.g. the IMSC 2021 may perform discovering an IMS address relating to the UE 201.

In optional step S1-1, e.g. the IMSC 2021 may perform generating a registration message comprising terminal identity information (e.g. special ICS IMPI) and integrity indication information (e.g. integrity_protected flag) indicating affirmative integrity of the terminal identity information (e.g. flag="yes").

In step S1-2, e.g. the IMSC 2021 may perform transmitting, after successful registration (see optional steps S0-1 to S0-3) of a terminal (e.g. UE 201) at a network entity (e.g. the IMSC 2021 itself), the registration message (e.g. SIP REGISTER).

As for further refinements of the above method related to the IMSC 2021, the registration message may be an initial registration message, a re-registration message or a de-registration message. Furthermore, the network entity may be the internet protocol multimedia subsystem centralized service enhanced mobile switching center.

Furthermore, in an optional step S2-1, e.g. the S-CSCF 2023 may perform receiving the registration message transmitted in step S1-2.

Then, in step S2-2, e.g. the S-CSCF 2023 may perform processing, after reception of the registration message (e.g. SIP REGISTER) comprising the terminal identity information (e.g. special ICS IMPI) and integrity indication information (e.g. integrity_protected flag) indicating integrity of the terminal identity information, the received registration message based on the terminal identity information and the integrity indication information such that,
 i) if the integrity is indicated affirmative, an authentication procedure of the terminal (e.g. UE 201) is skipped, or,
 ii) if the integrity is indicated negative (e.g. flag="no"), the received registration message is rejected without provisioning of key information related to registration of the terminal (not shown in FIG. 1).

Finally, in optional step S0-4, e.g. the network 202 may perform completing the registration signaling.

As for further refinements of the above method related to the S-CSCF 2023, the key information may relate to a secure registration between the terminal and a network control entity (e.g. a P-CSCF 2024 shown in FIG. 2). Furthermore, the processing of item i) may be performed if a successful registration of the terminal is recognized, and the processing of item ii) may be performed if the received registration message is recognized as unprotected. Moreover, the integrity indication information indicating negative integrity may be constituted by an integrity-protected flag being set to no (not shown in FIG. 1).

As for further refinements of the above methods related to both the IMSC 2021 and the S-CSCF 2023, the integrity indication information indicating affirmative integrity may be constituted by an integrity-protected flag being set to yes. Furthermore, the registration message may be a session initiation protocol (SIP) register message. Moreover, the terminal identity information may be constituted by a special internet protocol (IP) multimedia subsystem (IMS) centralized service (ICS) internet protocol multimedia private identity (IMPI).

As mentioned above, FIG. 2 shows those methods in case of rejection of the registration request. As shown in FIG. 2, in optional step S0-1, a malicious UE 201 may attempt to transmit e.g. a fraud SIP REGISTER request comprising its special ICS IMPI and the integrity-protected flag set to "yes".

In optional step S0-2, e.g. the P-CSCF 2024 may perform receiving the fraud SIP REGISTER request. In an optional step S0-3, e.g. the P-CSCF 2024 may perform processing such that if no security association (SA) for the received special ICS IMPI exists at the P-CSCF 2024, then the REGISTER request may be determined to be received outside any SA or with a SA not bound to the special ICS IMPI. In that case, the P-CSCF 2024 may set the integrity-protected to "no" or may remove this parameter.

Further, in an optional step S0-4, e.g. the P-CSCF 2024 may perform transmitting the SIP REGISTER request having the special ICS IMPI of the malicious UE 201 and the integrity-protected flag set to "no". This SIP REGISTER request may be received by the S-CSCF 2021 in the above-described optional step S2-1.

Then, in step S2-2, e.g. the S-CSCF 2023 may perform processing according to item ii) as described above.

Finally, in an optional step S0-5, e.g. the network 202 may perform rejecting the REGISTER request towards the malicious UE 201.

Figure 3:
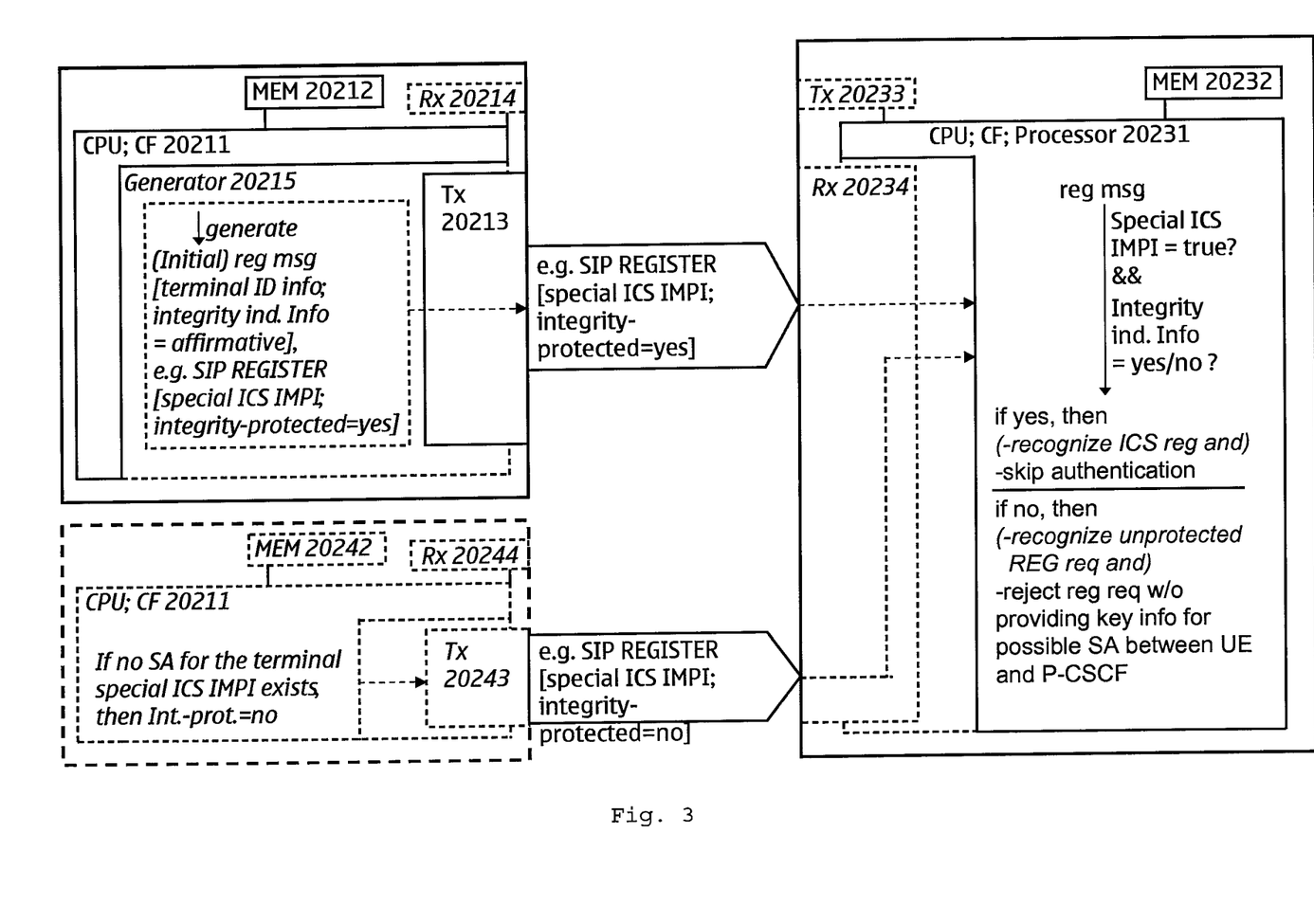
FIG. 3 shows apparatuses (e.g. IMSC 2021 and S-CSCF 2023) for identity protection according to an example of the present invention.

FIG. 3 shows apparatuses (e.g. IMSC 2021 and S-CSCF 2023) for identity protection according to an example of the present invention. Within FIG. 3, for ease of description, means or portions which may provide main functionalities are depicted with solid functional blocks or arrows and a normal font, while means or portions which may provide optional functions are depicted with dashed functional blocks or arrows and an italic font.

The IMSC 2021 may comprise a CPU (or core functionality CF) 20211, a memory 20212, a transmitter (or means for transmitting) 20213, an optional receiver (or means for receiving) 20214 and an optional generator (or means for generating) 20215.

In turn, the S-CSCF 2023 may comprise a CPU (or core functionality CF) 20231 which may also serve as a processor (or means for processing), a memory 20232, an optional transmitter (or means for transmitting) 20233 and an optional receiver (or means for receiving) 20234.

Finally, the optional P-CSCF 2024 may have a structure substantially similar to that of the S-CSCF 2023.

As indicated by the dashed extension of the functional block of the CPU 20211, the means for generating 20215 of the IMSC 2021 may be a functionality running on the CPU 20211 of the IMSC 2021 or may alternatively be a separate functional entity or means.

The CPUs 20×1 (wherein x=21 and 23) may respectively be configured to process various data inputs and to control the functions of the memories 20×2, the means for transmitting 202×3 and the means for receiving 20×4 (and the means for generating 20215 of the IMSC 20221). The memories 20×2 may serve e.g. for storing code means for carrying out e.g. the methods according to an example of the present invention, when run e.g. on the CPUs 20×1. It is to be noted that the means for transmitting 20×3 and the means for receiving 20×4 may alternatively be provided as respective integral transceivers. It is further to be noted that the transmitters/receivers may be implemented i) as physical transmitters/receivers for transceiving e.g. via an air interface (e.g. in case of transmitting between the UE 201 and the IMSC 2021), ii) as routing entities e.g. for transmitting/receiving data packets e.g. in a PS (packet switched) network (e.g. between the IMSC 2021 or P-CSCF 2024 and the S-CSCF 2023 when disposed as separate network entities), iii) as functionalities for writing/reading information into/ from a given memory area (e.g. in case of shared/common CPUs or memories e.g. of the IMSC 2021 or P-CSCF 2024 and the S-CSCF 2023 when disposed as an integral network entity (not shown)), or iv) as any suitable combination of i) to iii).

As optional preparatory measures, e.g. the UE 201 (not shown) may perform registering (or attaching) to the IMSC 2021. Furthermore, e.g. the IMSC 2021 may perform deciding on the IMS registration received from the UE 201, and e.g. the IMSC 2021 may perform discovering an IMS address relating to the UE 201 (e.g. special ICS IMPI).

Optionally, e.g. the means for generating 20215 of the IMSC 2021 may perform generating a registration message comprising terminal identity information (e.g. the special ICS IMPI) and integrity indication information (e.g. integrity_protected flag) indicating affirmative integrity of the terminal identity information (e.g. flag="yes").

Then, e.g. the means for transmitting 20213 of the IMSC 2021 may perform transmitting, after successful registration of a terminal (e.g. UE 201) at a network entity (e.g. the IMSC 2021 itself), the registration message (e.g. SIP REGISTER).

Alternatively, e.g. the P-CSCF 2024 may perform receiving the fraud SIP REGISTER request, and may perform processing such that if no security association (SA) for the received special ICS IMPI exists at the P-CSCF 2024, then the REGISTER request may be determined to be received outside any SA or with a SA not bound to the special ICS IMPI. In that case, the P-CSCF 2024 may set the integrity-protected to "no" or may remove this parameter, and may perform transmitting the SIP REGISTER request having the special ICS IMPI of the malicious UE 201 and the integrity-protected flag set to "no".

As for further refinements related to the IMSC 2021, the registration message may be an initial registration message, a re-registration message or a de-registration message. Furthermore, the network entity may be the internet protocol multimedia subsystem centralized service enhanced mobile switching center.

Optionally, e.g. the means for receiving 20234 of the S-CSCF 2023 may perform receiving the registration request message (comprising e.g. integrity-protected="yes") transmitted by the means for transmitting 20213 of the IMSC 2021 or the registration request message (comprising e.g. integrity-protected="no") transmitted by the P-CSCF 2024.

Then, e.g. the means for processing 20231 of the S-CSCF 2023 may perform processing, after reception of the registration message (e.g. SIP REGISTER) comprising the terminal identity information (e.g. special ICS IMPI) and integrity indication information (e.g. integrity_protected flag) indicating integrity of the terminal identity information, the received registration message based on the terminal identity information and the integrity indication information such that, i) if the integrity is indicated affirmative, an authentication procedure of the terminal (e.g. UE 201) is skipped, or, ii) if the integrity is indicated negative (e.g. flag="no"), the received registration message is rejected without provisioning of key information related to registration of the terminal.

As for further refinements related to the S-CSCF 2023, the key information may relate to a secure registration between the terminal and a network control entity (e.g. a P-CSCF 2024 shown in FIG. 2). Furthermore, the means for processing may be configured to process according to item i) if a successful registration of the terminal is recognized, and according to item ii) if the received registration message is recognized as unprotected. Moreover, the integrity indication information indicating negative integrity may be constituted by an integrity-protected flag being set to no.

As for further refinements related to both the IMSC 20221 and the S-CSCF 2023, the integrity indication information indicating affirmative integrity may be constituted by an integrity-protected flag being set to yes. Furthermore, the registration message may be a session initiation protocol (SIP) register message. Moreover, the terminal identity information may be constituted by a special internet protocol (IP) multimedia subsystem (IMS) centralized service (ICS) internet protocol multimedia private identity (IMPI).

Furthermore, at least one of, or more of means for transmitting 20213, means for generating 20215, means for processing 20231, means for receiving 20234 and/or the IMSC 2021 and/or the S-CSCF 2023, or the respective functionalities carried out, may be implemented as a chipset or module.

Finally, the present invention also relates to a system which may comprise a terminal or user equipment, the above-described IMSC 2021 and the above-described S-CSCF 2023.

Without being restricted to the details following in this section, the embodiment of the present invention may be summarized as follows:

As the ICS user has been already successfully authenticated in the CS domain, its IMS communication via the CS domain/IMSC server is protected. Therefore, a parameter that indicates successful "integrity-protection" may be used to indicate from the MSC server to the S-CSCF that authentication in IMS may be skipped. It is proposed to use a parameter in the Authorization header. A suitable parameter may the so called "integrity-protected" parameter.

When an ICS user accesses the IMS e.g. via an IMSC server, the IMSC server shall use the special ICS IMPI to register the ICS user with IMS (as specified e.g. in 3GPP TS 23.292). And in the REGISTER request, the "integrity-protected" parameter in the Authorization header may be set to "yes". Justification resides in that the user is already authenticated in IMSC. When the S-CSCF receives the REGISTER request and recognizes the special IMPI and the "integrity-protected" parameter is set to "yes", it may skip the authentication procedure for the REGISTER request. And the S-CSCF may always reject a REGISTER request with the special ICS IMPI, where the "integrity-protected" parameter is not set to "yes". The S-CSCF shall never provide keys in the rejection to allow UE and P-CSCF to establish a SA for the special ICS IMPI.

Because the "integrity-protected" parameter was introduced, all P-CSCFs may ensure that when "integrity-protected" parameter for a REGISTER request is set to "yes", this REGISTER request is received via a Security-Association (SA) for the ICS IMPI contained in the REGISTER request. Thus, it is ensured that misuse of the integrity-protected parameter by a malicious user may not happen. As the S-CSCF may never provide the keys to UE and P-CSCF to establish a SA for a special ICS IMPI, the S-CSCF may only receive a REGISTER for a special ICS IMPI from an IMSC, where the "integrity-protected" parameter is set to "yes". So, the S-CSCF may safely skip the authentication for such a REGISTER request.

In other words, when an attacker abuses the ICS IMPI to register with IMS, no SA can be established between a P-CSCF and the UE, as no keys are provided by the S-CSCF for that ICS IMPI. Therefore, no P-CSCF may set the "integrity-protected" parameter to "yes" for such a REGISTER request. And the S-CSCF may reject such a REGISTER request.

In still other words, it is proposed in the S-CSCF to allow the rejection of the request by the S-CSCF without the provisioning of any keys if ICS IMPI is recognized and the integrity flag is set to "no", and for skipping further authentication when the flag is set to "yes" and the special ICS IMPI is recognized.

Still further, e.g. a Release 5 S-CSCF may challenge the unprotected REGISTER request, where keys may be provided to protect the next REGISTER request. And, the UE may then insert a response to the challenge in a protected REGISTER request. The S-CSCF may only finally reject the protected REGISTER request, if the response from the UE is wrong. There are also other exceptional handlings for protected REGISTER request. But for an unprotected REGISTER request, the Release 5 S-CSCF may try to challenge the request, which is part of the authentication procedure.

Furthermore, the rejection is dependent on the definition of rejection: e.g. a Release 5 S-CSCF may reject an unprotected REGISTER request with a challenge (e.g. response code 401 Unauthorized). A UE may then respond to the challenge e.g. in the next REGISTER request. An S-CSCF supporting ICS users may reject an unprotected REGISTER request without any challenge or keys (e.g. response code 403 Forbidden). Both may be seen as rejection if a rejection is a negative response. An S-CSCF supporting ICS may use a special rejection. And, this special rejection may not provide any keys to protect communication between UE and P-CSCF.

Further Examples

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the IMSC and/or S-CSCF, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. IMSC and/or S-CSCF, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "UEs" represents "user equipments".

| | |
|---|---|
| 3GPP | 3rd generation partnership project |
| TR/TS | Technical report/technical specification |
| UE | User equipment |
| CS | Circuit switched |
| PS | Packet switched |
| IP | Internet protocol |
| IMS | IP multimedia subsystem |
| ICS | IMS Centralized Service |
| IMPI | IMS Private User Identity |
| MSC | Mobile switching center |
| IMSC | ICS enhanced MSC |
| SA | Security Association |
| CSCF | Call session control function |
| PANI | P-Access-Network-Info |
| P-CSCF | Proxy CSCF |
| S-CSCF | Serving CSCF |

The invention claimed is:

1. A method comprising:
receiving an attachment message from a user terminal;
authenticating the user terminal in an internet protocol multimedia subsystem (IMS);
when the user terminal has been authenticated, registering the user terminal;
transmitting a registration message to a serving call session control function (S-CSCF) server, the registration message including terminal identity information and integrity indication information for the authenticated user terminal, said integrity indication information indicating affirmative integrity of the terminal integrity information, to indicate the prior registration of the user terminal to the S-CSCF server; and
completing registration signaling with the S-CSCF server,
wherein the method is performed by an internet protocol multimedia subsystem centralized service enhanced mobile switching center (IMSC) server, said IMSC server including the internet protocol multimedia subsystem (IMS).

2. The method according to claim 1, further comprising generating the registration message.

3. The method according to claim 1, wherein the registration message is one of an initial registration message, a re-registration message and a de-registration message.

4. The method according to claim 1, wherein the registration message is a session initiation protocol register message.

5. The method according to claim 1, wherein the terminal identity information is constituted by a special internet protocol multimedia subsystem centralized service internet protocol multimedia private identity.

6. A method comprising:
receiving, from an internet protocol multimedia subsystem centralized service enhanced mobile switching center (IMSC) server, a registration message including terminal identity information and integrity indication information, said integrity indication information indicating affirmative integrity of the terminal integrity information, for a user terminal authenticated in an internet protocol multimedia subsystem (IMS) of the IMSC server, to indicate the prior registration of the terminal by the entity IMSC server;
processing the received registration message based on the terminal identity information and the integrity indication information;
skipping an authentication procedure of the user terminal when the integrity indication information indicates the prior registration of the user terminal by the IMSC server; and
completing registration signaling with the IMSC server,
wherein the method is performed by a serving call session control function (S-CSCF) server.

7. The method according to claim 6, wherein the registration message is a session initiation protocol register message.

8. An apparatus comprising:
at least one processor; and
at least one memory including computer program code, the at least one memory and the computer program code configured, with the at least one processor, to cause the apparatus to perform the following:
receiving an attachment message from a user terminal;
authenticating the user terminal in an internet protocol multimedia subsystem (IMS);
when the user terminal has been authenticated, registering the user terminal;
transmitting a registration message to a serving call session control function (S-CSCF) server, the registration message including terminal identity information and integrity indication information for the authenticated user terminal, said integrity indication information indicating affirmative integrity of the terminal integrity information, to indicate the prior registration of the user terminal to the S-CSCF server; and
completing registration signaling with the S-CSCF server,
wherein the apparatus is an internet protocol multimedia subsystem centralized service enhanced mobile switching center (IMSC) server, said IMSC server including the internet protocol multimedia subsystem (IMS).

9. The apparatus according to claim 8, wherein the at least one memory and the computer program code are further configured, with the at least one processor, to cause the apparatus to generate the registration message.

10. The apparatus according to claim 8, wherein the registration message is one of an initial registration message, a re-registration message and a de-registration message.

11. The apparatus according to claim 8, wherein the registration message is a session initiation protocol register message.

12. The apparatus according to claim 8, wherein the terminal identity information is constituted by a special internet protocol multimedia subsystem centralized service internet protocol multimedia private identity.

13. The apparatus according to claim 8, wherein the apparatus is implemented as a chipset or module.

14. An apparatus comprising:
at least one processor; and
at least one memory including computer program code, the at least one memory and the computer program code configured, with the at least one processor, to cause the apparatus to perform the following:
receiving, from an internet protocol multimedia subsystem centralized service enhanced mobile switching center (IMSC) server, a registration message including terminal identity information and integrity indication information, said integrity indication information indicating affirmative integrity of the terminal integrity information, for a user terminal authenticated in an internet protocol multimedia subsystem (IMS) of the IMSC server, to indicate the prior registration of the user terminal by the IMSC server;
processing the received registration message based on the terminal identity information and the integrity indication information;

skipping an authentication procedure of the user terminal when the integrity indication information indicates the prior registration of the terminal by the IMSC server; and completing registration signaling with the IMSC server, wherein the apparatus is a serving call session control function (S-CSCF) server.

15. The apparatus according to claim 14, wherein the registration message is a session initiation protocol register message.

16. The apparatus according to claim 14, wherein the apparatus is implemented as a chipset or module.

17. A system comprising:

a user terminal;

an internet protocol multimedia subsystem centralized service enhanced mobile switching center (IMSC) server, said IMSC server including an internet protocol multimedia subsystem (IMS), comprising:

at least one processor; and at least one memory including computer program code, the at least one memory and the computer program code configured, with the at least one processor, to cause the IMSC server to perform the following:

receiving an attachment message from the user terminal;

authenticating the user terminal in the internet protocol multimedia subsystem (IMS);

when the user terminal has been authenticated, registering the user terminal;

transmitting a registration message to a serving call session control function (S-CSCF) server, the registration message including terminal identity information and integrity indication information for the authenticated user terminal, said integrity indication information indicating affirmative integrity of the terminal integrity information, to indicate the prior registration of the user terminal to the S-CSCF server; and completing registration signaling with the S-CSCF server; and the S-CSCF server comprising:

at least one processor; and at least one memory including computer program code, the at least one memory and the computer program code configured, with the at least one processor, to cause the S-CSCF server to perform the following:

receiving from the IMSC server the registration message including terminal identity information and integrity indication information, said integrity indication information indicating affirmative integrity of the terminal integrity information, for the user terminal authenticated in the internet protocol multimedia subsystem (IMS) of the IMSC server, to indicate prior registration of the terminal by the IMSC server;

processing the received registration message based on the terminal identity information and the integrity indication information;

skipping an authentication procedure of the user terminal when the integrity indication information indicates the prior registration of the user terminal by the IMSC server; and completing registration signaling with the IMSC server.

18. A computer program product comprising a non-transitory computer-readable storage medium bearing computer program code embodied therein for use with a computer, the computer program code comprising code for performing:

receiving an attachment message from a user terminal;

authenticating the user terminal in an internet protocol multimedia subsystem (IMS);

when the user terminal has been authenticated, registering the user terminal;

transmitting a registration message to a serving call session control function (S-CSCF) server, the registration message including terminal identity information and integrity indication information for the authenticated user terminal, said integrity indication information indicating affirmative integrity of the terminal integrity information, to indicate the prior registration of the user terminal to the S-CSCF server; and completing registration signaling with the S-CSCF server, wherein the computer program code is for an internet protocol multimedia subsystem centralized service enhanced mobile switching center (IMSC) server, said IMSC server including the internet protocol multimedia subsystem (IMS).

19. A computer program product comprising a non-transitory computer-readable storage medium bearing computer program code embodied therein for use with a computer, the computer program code comprising code for performing:

receiving, from an internet protocol multimedia subsystem centralized service enhanced mobile switching center (IMSC) server, a registration message including terminal identity information and integrity indication information, said integrity indication information indicating affirmative integrity of the terminal integrity information, for a user terminal authenticated in an internet protocol multimedia subsystem (IMS) of the IMSC server, to indicate the prior registration of the terminal by the IMSC server;

processing the received registration message based on the terminal identity information and the integrity indication information;

skipping an authentication procedure of the user terminal when the integrity indication information indicates the prior registration of the user terminal by the IMSC server; and completing registration signaling with the IMSC server, wherein the computer program code is for a serving call session control function (S-CSCF) server.

* * * * *

UNITED STATES PATENT AND TRADEMARK OFFICE
CERTIFICATE OF CORRECTION

PATENT NO. : 10,581,822 B2  
APPLICATION NO. : 13/056672  
DATED : March 3, 2020  
INVENTOR(S) : Shen Page 1 of 1

It is certified that error appears in the above-identified patent and that said Letters Patent is hereby corrected as shown below:

In the Claims

Claim 6, Column 13, Line 62 "entity" should be deleted in between --the-- and --IMSC--.

Claim 17, Column 15, Line 53 --the-- should be inserted in between --indicate-- and --prior--.

Signed and Sealed this  
Twenty-eighth Day of April, 2020

Andrei Iancu  
*Director of the United States Patent and Trademark Office*